United States Patent [19]

Kleinpell, II et al.

[11] Patent Number: 5,836,041

[45] Date of Patent: Nov. 17, 1998

[54] ICE SCRAPER

[76] Inventors: Arthur S. Kleinpell, II, 2565 Kent Ridge Ct., Bloomfield Township, Mich. 48301; Lori Wachler, 26524 Hendrie Blvd., Huntington Woods, Mich. 48070

[21] Appl. No.: 840,973

[22] Filed: Apr. 21, 1997

Related U.S. Application Data

[60] Provisional application No. 60/015,918 Apr. 22, 1996.
[51] Int. Cl.⁶ .................................. B60S 1/04; A47L 1/06
[52] U.S. Cl. .......................... 15/236.02; 30/169; D32/43; D32/49; 15/143.1; 16/110 R
[58] Field of Search ........................... 15/236.02, 236.01, 15/236.05, 236.07, 111, 143.1, 105; D32/40, 43, 46, 49; 16/110 R; 30/169

[56] References Cited

U.S. PATENT DOCUMENTS

| | | | |
|---|---|---|---|
| D. 44,927 | 11/1913 | Layton | D32/43 |
| D. 340,264 | 10/1993 | Anthony | D32/46 |
| 698,849 | 4/1902 | Ovellette | 15/236.01 |
| 1,018,518 | 2/1912 | Pettit | 15/236.01 |
| 2,046,334 | 7/1936 | Loeber | 30/169 |
| 2,517,247 | 8/1950 | Seley | 15/236.02 |
| 3,017,649 | 1/1962 | Racicot | 15/111 |
| 3,051,975 | 9/1962 | Schwartz | 15/236.02 |
| 3,408,681 | 11/1968 | Isakson | 15/236.01 |
| 4,124,915 | 11/1978 | Schlicher | 15/236.02 |
| 4,275,476 | 6/1981 | Hopkins et al. | 15/236.02 |
| 5,095,573 | 3/1992 | Henke et al. | 15/236.05 |

*Primary Examiner*—Gary K. Graham
*Attorney, Agent, or Firm*—Thomas P. Mahoney

[57] ABSTRACT

An ice scraper having a handle with a representational element mounted at its lower extremity, said representational element having a scraper blade incorporated in its lower extremity. The handle incorporates reinforcing means which extend downwardly into the representational element to rigidify the same.

8 Claims, 2 Drawing Sheets

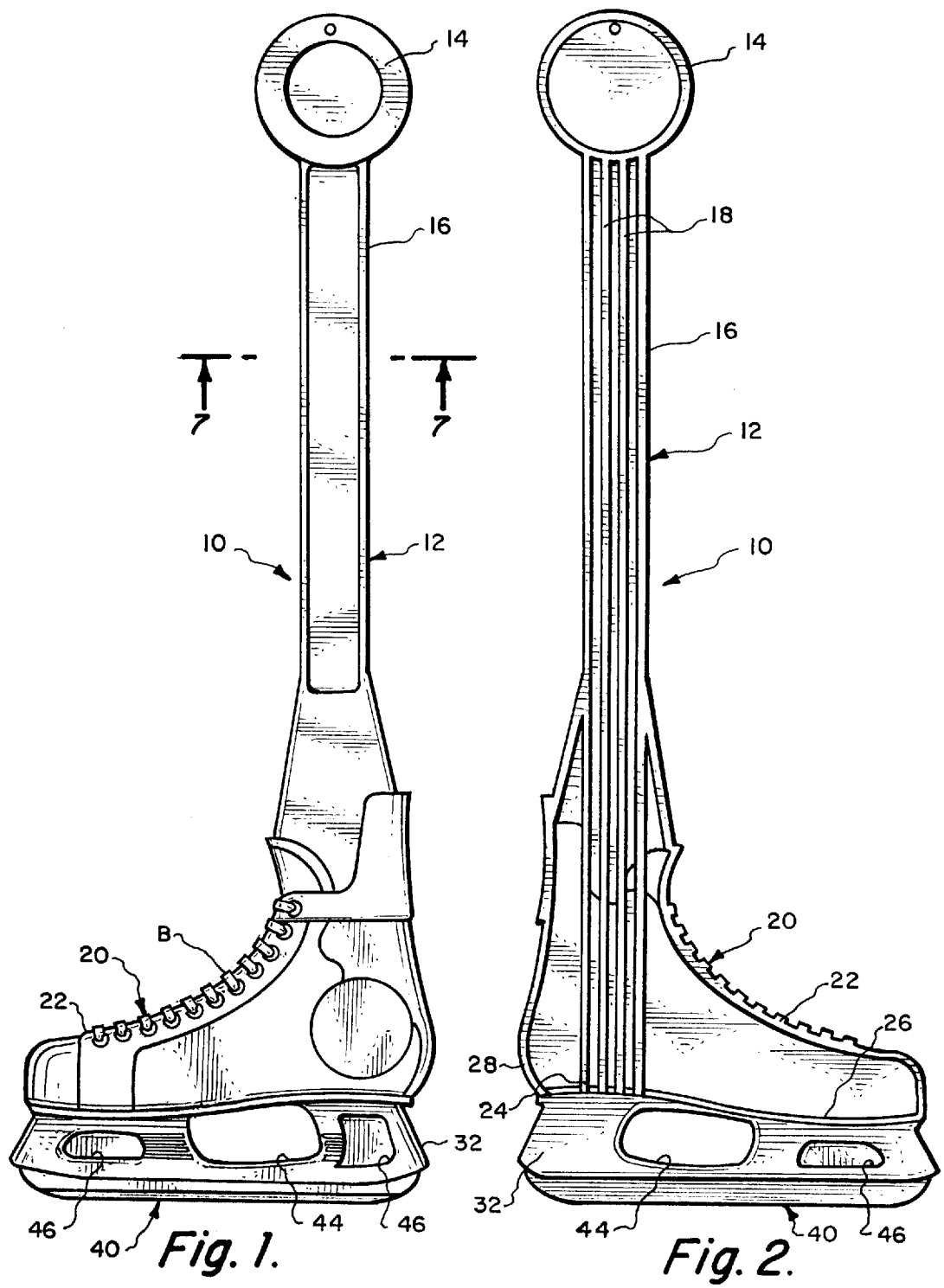

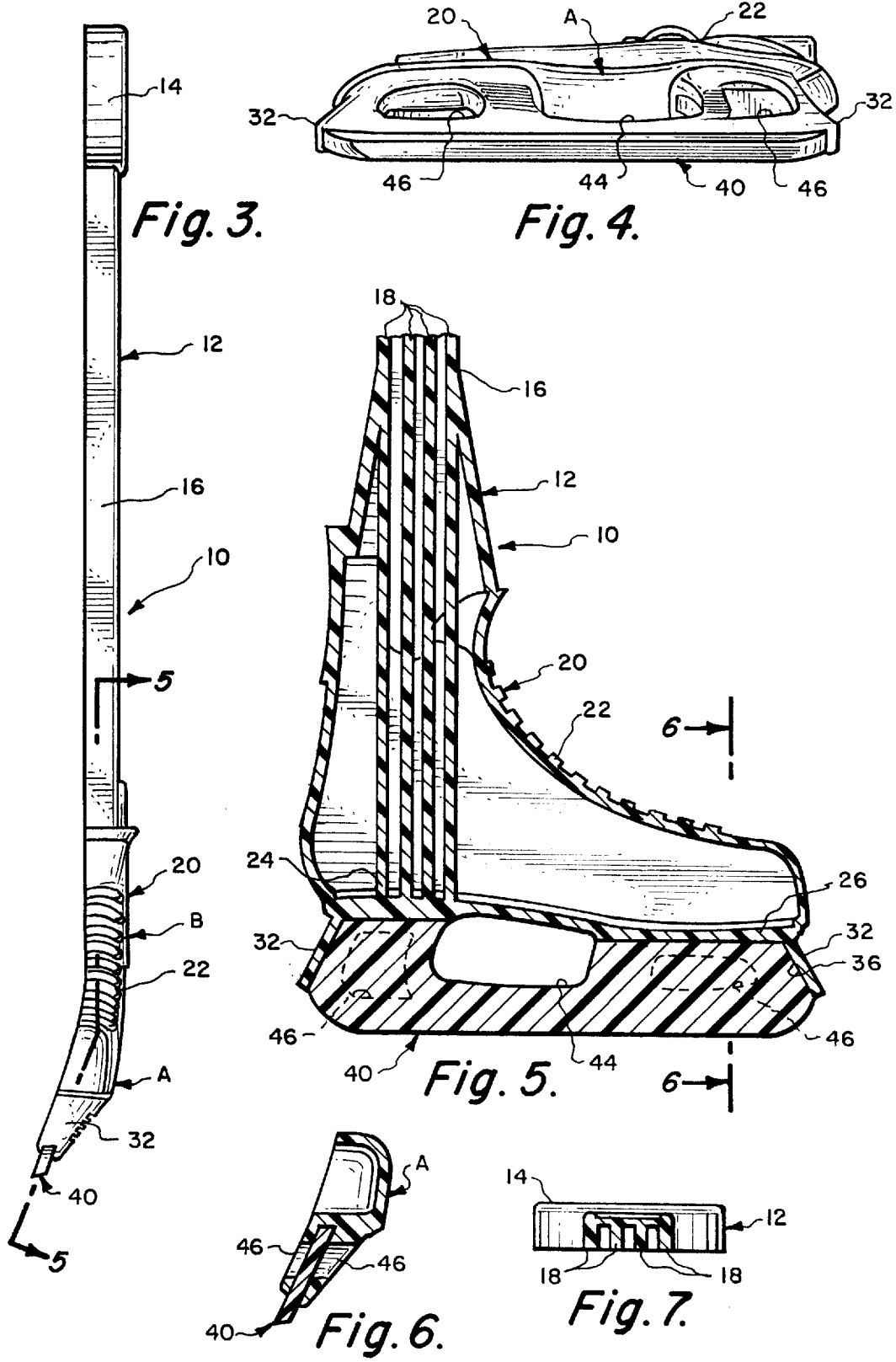

ICE SCRAPER

This application claims the benefit of U.S. provisional application Ser. No. 60/015,918 filed Apr. 22, 1996.

This invention relates to an ice scraper for automobile windshields, and, more particularly, to an ice scraper having the depiction of an article such as a sleigh or hockey shoe skate at one extremity so that the blade of the sleigh or skate constitutes the scraper portion of the ice scraper.

BACKGROUND OF THE INVENTION

Conventional ice scrapers are provided in a strictly utilitarian combination of a handle and a scraper blade formed from a common material such as synthetic plastic or the like. Alternative forms of ice scrapers utilize wooden handles having a scraper blade assembly attached to the lower extremity thereof.

In addition, many conventional scrapers are inadequate to sustain the loads imposed thereupon during the scraping procedure, thus resulting in the breaking of the handles or damage to the blades.

OBJECTS AND ADVANTAGES OF THE INVENTION

It is, therefore, an object of our invention to provide an ice scraper which is of unitary construction, preferably manufactured by injection molding of suitable synthetic plastic such as high-density polyethylene, said ice scraper having a handle which has formed integrally therewith a representation of an object associated, for example, with a particular sport or season of the year or a particular holiday, said representation having provided on the lower extremity thereof a scraper blade which is integrated into the design of the representation. For instance, a hockey boot representation will have a scraper blade which is represented as the blade of the hockey boot. Similarly, a representation of a Santa sleigh will have a scraper blade which is represented as the blade of the sleigh.

Normally, the entire assemblage, including the scraper blade, is fabricated as a unitary, injection-molded structure with the scraper blade integral with the remainder of the ice scraper.

Another object of our invention provides an ice scraper which has a body fabricated from a relatively inexpensive material, such as low-density polyethylene and a scraper blade which is fabricated from relatively more effective material such as polycarbonate.

Another object of our invention is the provision of an ice scraper of the aforementioned character wherein the body of the scraper consists of an elongated handle on the lower extremity of which is provided a representation of an object which conventionally incorporates a blade such as a hockey skate boot or a sleigh and which is provided with means for the reception of the scraper blade. This facilitates the manufacture of the ice scraper in two components, namely, the handle and representational portion fabricated from relatively low-cost material and the blade fabricated from more expensive, but more effective material for the scraping task.

An additional object of our invention is the provision of an ice scraper of the aforementioned character wherein the handle incorporates reinforcing means extending into the body of the representational portion of the ice scraper to facilitate the absorption of loads encountered when the scraper portion of the ice scraper is utilized.

Other objects and advantages of the invention will be apparent from the specification and the drawings.

BRIEF DESCRIPTION OF THE DRAWINGS

FIG. 1 is a front elevational view;

FIG. 2 is a rear elevational view;

FIG. 3 is a front edge view;

FIG. 4 is a bottom view;

FIG. 5 is an enlarged sectional view taken on the broken line 5—5 of FIG. 3;

FIG. 6 is a partial fragmentary sectional view taken on the broken line 6—6 of FIG. 5; and FIG. 7 is a transverse sectional view taken on the broken line 7—7 of FIG. 1.

Referring to the drawings, and particularly to FIGS. 1 and 2 thereof, I show an ice scraper 10 fabricated in accordance with the teaching of the invention and including an elongated handle 12 which incorporates an extremity 14 of substantially circular configuration. The circular portion 14 constitutes a grip for the handle 12 and, in the present embodiment of the invention, represents a hockey puck. The elongated shank 16 of the handle has its rear portion provided with a plurality of reinforcing ribs 18 which are molded integrally with the extremity 14 and which extend downwardly in proximity to the lower end of the ice scraper 10, as best shown in FIG. 2 of the drawings to rigidify, not only the handle, but the representational embodiment 20 formed integrally with the handle.

In the present case, the representational embodiment 20 is in the shape of a hockey boot or shoe skate 22 which is molded integrally with the handle 12 and which receives the lower extremities of the reinforcing means or ribs 18 at 24 adjacent the sole 26 of the boot. Therefore, although the boot 22 is hollow molded, that is, molded in a relatively thin wall cross section, as indicated at 28, the reinforcement of the ribs 18 of the shank 16 of the handle 12 prevents distortion or breaking of the handle 12 of the boot 22 when the loads characteristic of the ice scraping process are encountered.

Formed integrally with the lower extremity of the boot 22 is a representation of the upper portion of a skate blade 32. The skate blade 32 representation incorporates a pocket 36 which, as best shown in FIGS. 5 and 6 of the drawings, incorporates the scraper blade 40.

As previously indicated, the elongated ribs 18 extending from the top to the bottom of the shank 16 of the handle 12 terminate at 24 and are molded integrally with the sole 26 of the boot 22, thus materially rigidifying the boot 22 and the blade representation 32 which is formed integrally with the boot 22.

The handle 12 and boot 22 are thus integral with each other and fabricated from relatively inexpensive plastic material, such as low-density polystyrene or reground plastic materials which can be readily injection molded and, thus, when so molded the handle 12 and boot 22 together with the blade extension 32 of the boot are fabricated from the same color material. However, it is contemplated that the boot can be colored by suitable processes such as screen printing to a different color from the handle to convey an accurate representation of a boot while the blade extension 32 can be painted a silver color to impart the visual impression of a blade. Similarly, the ice scraper blade 40 can be painted or coated with the same silver coloration as the blade extension 32 of the boot 22 to provide an integrated representation of a hockey boot 22 complete with the skate blade. As previously mentioned, the preferred method of manufacturing the handle and boot constituting the major portion of the ice scraper 10 is by injection molding.

To integrate the scraper blade 40 with the boot 22, a previously manufactured scraper blade 40, which can be molded from polycarbonate or other relatively expensive synthetic plastic material, may be inserted in the injection mold in a position wherein it will be encompassed by the blade extension 32 of the boot 22.

To provide an accurate reproduction of the boot and blade combination, the polycarbonate blade is provided with a centrally located opening 44 which is maintained during the injection molding process by the provision of a suitable insert in the mold. Additional openings 46 in the blade 40 are filled with the molding material of the boot 22 and serve as means for maintaining and locating the blade 40 in operative relationship with the pocket 36 defined by the blade extension 32.

Because of the fact that the handle and boot portions of the scraper are molded from relatively inexpensive material, while the scraper blade insert is manufactured from expensive material, the overall cost of manufacture of the composite is substantially reduced. Moreover, since the scraper blade is fabricated from hard, expensive material, an effective scraping action can be achieved.

It is also feasible to manufacture the scraper blade 40 integrally with the remainder of the ice scraper 10 if an intermediate strength material such as high-density polyethylene is utilized. When that type of manufacture occurs, the necessity for the separate fabrication of the scraper blade 40 is, of course, eliminated as are the assembly steps entailed by the provision of a separate scraper blade 40.

Moreover, the representational embodiment 20, as exemplified in the shape of a hockey boot or shoe skate 22, provides a three-dimensional effect due to the hollow, shell-like molding of the hockey boot or shoe skate 22 as exemplified at "A" in FIGS. 3 and 4 of the drawings. The three-dimensional effect is also exemplified at "B" in FIGS. 1 and 3 of the drawings. The achievement of the three-dimensional effect of the representational portion 20 of the scraper 10 is facilitated by the rigidifying action of the ribs of the reinforcing ribs 18 which extend through the representation 20 to the lower portion thereof as indicated at 24 in FIGS. 2 and 5 of the drawings.

It will be understood that the configuration of the representational portion 20 of the scraper 10 can be changed to represent various sport or other motifs without departing from the scope of the appended claims or the spirit of the invention.

We claim:

1. In an ice scraper, the combination of: an elongated hollow handle having upper and lower extremities and providing an elongated channel; a hollow representational image on the lower extremity of said handle, said image having upper and lower extremities; reinforcing means located inside said channel and said image extending from the upper extremity of said handle through said hollow image to the lower extremity of said image to reinforce said image, said reinforcing means including a plurality of elongated ribs located in said channel in side-by-side relationship; and a scraper blade on the lower extremity of said image.

2. The ice scraper of claim 1 in which all of said handle, image, and blade of claim 1 are molded integrally with one another.

3. The ice scraper of claim 1 in which said scraper blade is molded separately and subsequently secured to the lower extremity of said image.

4. The ice scraper of claim 1 in which said image is constituted by a hollow shell providing a three-dimensional configuration for said image.

5. In an ice scraper, the combination of: a hollow handle having upper and lower extremities and providing an elongated channel, said handle incorporating elongated reinforcing ribs extending downwardly from the upper extremity thereof and beyond the lower extremity of said handle said ribs being disposed in side-by-side relationship in said channel, said ribs having upper and lower extremities; a hollow representational image on the lower extremity of said handle, the lower extremity of said ribs spanning said image to rigidify the same; and an ice scraper blade provided on the lower portion of said image and supported by said image and said ribs.

6. The ice scraper of claim 5 in which said ice scraper blade is integral with said image.

7. The ice scraper of claim 5 in which said ice scraper blade is fabricated separately from said representation and subsequently affixed thereto.

8. The ice scraper of claim 5 in which said image is constituted by a hollow, three-dimensional shell which has said reinforcing ribs of said handle extending therethrough.

* * * * *